US011336665B2

(12) United States Patent
Thayer et al.

(10) Patent No.: US 11,336,665 B2
(45) Date of Patent: May 17, 2022

(54) IDENTIFYING MALWARE-SUSPECT END POINTS THROUGH ENTROPY CHANGES IN CONSOLIDATED LOGS

(71) Applicant: Musarubra US LLC, San Jose, CA (US)

(72) Inventors: Peter Thayer, Santa Clara, CA (US); Gabriel G. Infante-Lopez, Cordoba (AR); Leandro J. Ferrado, Cordoba (AR); Alejandro Houspanossian, Cordoba (AR)

(73) Assignee: Musarubra US LLC, San Jose, CA (US)

( * ) Notice: Subject to any disclaimer, the term of this patent is extended or adjusted under 35 U.S.C. 154(b) by 232 days.

(21) Appl. No.: 16/588,642

(22) Filed: Sep. 30, 2019

(65) Prior Publication Data
US 2020/0106786 A1 Apr. 2, 2020

Related U.S. Application Data

(63) Continuation of application No. 15/476,212, filed on Mar. 31, 2017, now Pat. No. 10,440,037.

(51) Int. Cl.
*G06N 20/00* (2019.01)
*G06N 20/20* (2019.01)
(Continued)

(52) U.S. Cl.
CPC ......... *H04L 63/1416* (2013.01); *G06N 20/00* (2019.01); *H04L 63/145* (2013.01);
(Continued)

(58) Field of Classification Search
CPC . H04L 63/14; H04L 63/1408; H04L 63/1416; H04L 63/1425; H04L 63/1433;
(Continued)

(56) References Cited

U.S. PATENT DOCUMENTS 6,519,766 B1 * 2/2003 Barritz ................ G06F 11/3466
714/E11.2
7,779,119 B2 * 8/2010 Ginter ................. H04L 63/0263
709/224

(Continued)

OTHER PUBLICATIONS

United States Patent and Trademark Office, "Notice of Allowance," mailed in connection with U.S. Appl. No. 15/476,212, dated May 29, 2019, 18 pages.

(Continued)

*Primary Examiner* — Kambiz Zand
*Assistant Examiner* — Mahabub S Ahmed
(74) *Attorney, Agent, or Firm* — Hanley, Flight & Zimmerman, LLC

(57) ABSTRACT

Example methods disclosed herein to determine whether a first monitored device is compromised include determining a first entropy value for the first monitored device based on a first number of unique event identifiers included in log entries obtained for the first monitored device, the log entries associated with a first time window. Disclosed example methods also include determining a second entropy value for the first monitored device based on numbers of unique event identifiers included in corresponding groups of log entries obtained for respective ones of a plurality of monitored devices including the first monitored device, the groups of log entries associated with the first time window. Disclosed example methods further include determining whether the first monitored device is compromised based on the first entropy value and the second entropy value, and performing an action in response to a determination that the first monitored device is compromised.

18 Claims, 6 Drawing Sheets

(51) Int. Cl.
  *G06N 7/00* (2006.01)
  *H04L 29/06* (2006.01)
(52) U.S. Cl.
  CPC .......... *H04L 63/1425* (2013.01); *G06N 7/005* (2013.01); *G06N 20/20* (2019.01)
(58) Field of Classification Search
  CPC ..... H04L 63/145; G06F 17/18; G06N 99/005; G06N 20/00; G06N 20/20; G06N 7/005
  USPC ..................................................... 726/22–25
  See application file for complete search history.

(56) References Cited

U.S. PATENT DOCUMENTS

| | | | | |
|---|---|---|---|---|
| 7,831,705 | B1* | 11/2010 | Agbabian | H04L 63/1425 709/224 |
| 8,401,982 | B1* | 3/2013 | Satish | G06N 20/00 706/20 |
| 8,606,913 | B2* | 12/2013 | Lin | H04L 41/0681 709/224 |
| 8,850,571 | B2* | 9/2014 | Staniford | G06F 9/45533 726/22 |
| 9,223,972 | B1* | 12/2015 | Vincent | G06F 21/566 |
| 9,699,042 | B2* | 7/2017 | Krynski | H04L 43/04 |
| 9,756,061 | B1* | 9/2017 | Roeh | H04L 63/1425 |
| 10,122,575 | B2* | 11/2018 | Petersen | G06F 11/0748 |
| 10,122,746 | B1* | 11/2018 | Manni | H04L 63/1416 |
| 10,237,294 | B1* | 3/2019 | Zadeh | H04L 63/1425 |
| 10,505,826 | B2* | 12/2019 | Poola | H04L 67/10 |
| 10,893,058 | B1* | 1/2021 | Casaburi | H04L 63/1416 |
| 2006/0123101 | A1* | 6/2006 | Buccella | G06F 21/554 709/223 |
| 2006/0236401 | A1* | 10/2006 | Fosdick | H04L 63/1458 726/25 |
| 2007/0294369 | A1* | 12/2007 | Ginter | H04L 63/1416 709/217 |
| 2008/0184367 | A1* | 7/2008 | McMillan | G06F 21/563 726/23 |
| 2008/0250497 | A1* | 10/2008 | Mullarkey | H04L 41/142 726/22 |
| 2009/0254970 | A1* | 10/2009 | Agarwal | H04L 63/1425 726/1 |
| 2009/0276852 | A1* | 11/2009 | Alderson | H04L 63/145 726/23 |
| 2010/0011031 | A1* | 1/2010 | Huang | H04L 63/1425 707/E17.007 |
| 2010/0162396 | A1* | 6/2010 | Liu | H04L 63/1425 726/23 |
| 2010/0235915 | A1* | 9/2010 | Memon | H04L 63/145 726/23 |
| 2010/0281540 | A1* | 11/2010 | Alme | G06F 21/563 726/23 |
| 2010/0284282 | A1* | 11/2010 | Golic | H04L 63/1425 370/242 |
| 2011/0078797 | A1* | 3/2011 | Beachem | H04L 63/1441 726/25 |
| 2012/0110672 | A1* | 5/2012 | Judge | H04L 51/12 726/25 |
| 2012/0117254 | A1* | 5/2012 | Ehrlich | H04L 41/142 709/228 |
| 2012/0136909 | A1* | 5/2012 | Wang | G06F 21/552 708/204 |
| 2013/0044942 | A1* | 2/2013 | Fan | G06K 9/6292 382/159 |
| 2013/0104230 | A1* | 4/2013 | Tang | H04L 63/1458 726/23 |
| 2013/0298192 | A1* | 11/2013 | Kumar | G06F 21/52 726/3 |
| 2013/0298230 | A1* | 11/2013 | Kumar | H04L 63/1425 726/22 |
| 2013/0298242 | A1* | 11/2013 | Kumar | G06F 21/564 726/25 |
| 2013/0298244 | A1* | 11/2013 | Kumar | H04L 67/10 726/25 |
| 2014/0298461 | A1* | 10/2014 | Hohndel | G06F 21/554 726/23 |
| 2015/0121518 | A1* | 4/2015 | Shmueli | H04L 63/1425 726/22 |
| 2015/0163121 | A1* | 6/2015 | Mahaffey | H04W 12/12 707/687 |
| 2015/0213631 | A1* | 7/2015 | Vander Broek | G06T 11/206 345/589 |
| 2015/0381649 | A1* | 12/2015 | Schultz | H04L 63/1433 726/25 |
| 2016/0028757 | A1* | 1/2016 | Kruglick | H04L 63/14 726/23 |
| 2016/0127406 | A1* | 5/2016 | Smith | H04L 63/1458 726/23 |
| 2016/0217022 | A1* | 7/2016 | Velipasaoglu | G06F 11/0772 |
| 2016/0255115 | A1* | 9/2016 | Mital | H04L 63/1433 726/1 |
| 2016/0277423 | A1* | 9/2016 | Apostolescu | G06F 21/566 |
| 2016/0292418 | A1* | 10/2016 | Wojnowicz | G06N 3/08 |
| 2016/0308892 | A1* | 10/2016 | Hohndel | H04L 63/145 |
| 2016/0350165 | A1* | 12/2016 | LeMond | G06F 11/079 |
| 2016/0359872 | A1* | 12/2016 | Yadav | H04L 63/1425 |
| 2016/0359881 | A1* | 12/2016 | Yadav | G06F 21/53 |
| 2017/0044942 | A1 | 2/2017 | Barnickel | |
| 2017/0063887 | A1* | 3/2017 | Muddu | G06F 16/9024 |
| 2017/0149811 | A1* | 5/2017 | Corrales | H04L 63/1425 |
| 2017/0171231 | A1* | 6/2017 | Reybok, Jr. | H04L 63/14 |
| 2017/0214708 | A1* | 7/2017 | Gukal | G06F 16/285 |
| 2017/0223032 | A1* | 8/2017 | El-Moussa | H04L 63/1425 |
| 2017/0293757 | A1* | 10/2017 | Rosenman | H04L 63/1433 |
| 2017/0346853 | A1* | 11/2017 | Wyatt | H04L 9/3265 |
| 2017/0374094 | A1* | 12/2017 | Agarmore | H04W 12/35 |
| 2018/0115567 | A1* | 4/2018 | El-Moussa | G06F 17/141 |
| 2018/0139221 | A1* | 5/2018 | Chen | H04L 63/1425 |
| 2018/0165173 | A1* | 6/2018 | Lin | G06F 16/258 |
| 2018/0176247 | A1* | 6/2018 | Smith | H04L 63/1458 |
| 2018/0182029 | A1* | 6/2018 | Vinay | G06N 20/00 |
| 2018/0182042 | A1* | 6/2018 | Vinay | G06Q 40/12 |
| 2018/0219879 | A1* | 8/2018 | Pierce | H04L 41/142 |
| 2018/0219890 | A1* | 8/2018 | Rehak | H04L 63/14 |
| 2018/0225390 | A1* | 8/2018 | Bhattacharyya | G06F 16/90335 |
| 2018/0234443 | A1* | 8/2018 | Wolkov | G06K 9/6277 |
| 2018/0268304 | A1* | 9/2018 | Manadhata | G06N 5/04 |
| 2018/0288074 | A1 | 10/2018 | Thayer et al. | |
| 2018/0337782 | A1* | 11/2018 | Wu | H04L 9/0836 |
| 2018/0359268 | A1* | 12/2018 | Shen | G06F 17/18 |
| 2019/0182283 | A1* | 6/2019 | Nakata | H04L 63/1425 |
| 2019/0387005 | A1* | 12/2019 | Zawoad | H04L 63/1425 |
| 2020/0050760 | A1* | 2/2020 | El-Moussa | H04L 63/1408 |
| 2020/0053104 | A1* | 2/2020 | El-Moussa | G06N 3/084 |
| 2020/0105262 | A1* | 4/2020 | Abhinav | G06K 9/00523 |

OTHER PUBLICATIONS

United States Patent and Trademark Office, "Final Office Action," mailed in connection with U.S. Appl. No. 15/476,212, dated Mar. 6, 2019, 21 pages.

United States Patent and Trademark Office, "Non-final Office Action," mailed in connection with U.S. Appl. No. 15/476,212, dated Nov. 15, 2018, 28 pages.

* cited by examiner

IDENTIFYING MALWARE-SUSPECT END POINTS THROUGH ENTROPY CHANGES IN CONSOLIDATED LOGS

RELATED APPLICATION(S)

This patent arises from a continuation of U.S. patent application Ser. No. 15/476,212, (now U.S. Pat. No. 10,440, 037), which is entitled "IDENTIFYING MALWARE-SUSPECT ENDPOINTS THROUGH ENTROPY CHANGES IN CONSOLIDATED LOGS," and which was filed on Mar. 31, 2017. Priority to U.S. patent application Ser. No. 15/476, 212 is claimed. U.S. patent application Ser. No. 15/476,212 is hereby incorporated herein by reference in its entirety.

FIELD OF THE DISCLOSURE

Embodiments described herein generally relate to data security, and more specifically to identifying malware-suspect endpoints through entropy changes in consolidated logs.

BACKGROUND

In many network setups, endpoint devices are monitored by different sensors, for example, antivirus or intrusion prevention systems. Typically, these sensors log activity to a log file or database on a server, such as a McAfee ePolicy Orchestrator (McAfee ePO) server or a security information and event management (SIEM) product, such as HP Arcsight® (ARCSIGHT is a registered trademark of HP) or NitroSecurity (NITROSECURITY is a trademark of McAfee). For simplicity, this discussion groups any activity recording at a centralized server whether to a database, memory store, or flat file, as a "log entry". Under normal conditions, endpoints (a computer existing on the monitored network) produce a "normal" set of log entries where the entries and the rate of entries occur with relatively similar frequency as other end points. However, when an unusual activity occurs, log entries differ and rate of log entries will vary from other "normal" end point activity.

As an example, a typical kill-chain in a web based attack, such as Conficker, will prompt a user to select a hyper link, that vectors to a hidden iFrame containing script for an RPC request to an infected server. The request will spray the heap with shellcode and cause a buffer overflow in the target (victim) endpoint. The shellcode then generates an HTTP "get request" to download an infected application file and makes registry changes allowing it to execute as a service. In a lateral attack, an intruder is attempting to infiltrate other endpoints on the network. One computer, infected with a remote access Trojan (RAT) variant, will attempt to infect shared files or harvest credentials from other endpoints. At some point, the attacker will begin exfiltration of data. In both these scenarios, sensors will note more activity. VSE may report a buffer overflow. GTI may report traffic to a malicious or unknown server. Failed credentials, network traffic on unusual ports or to unknown IPs, execution of files from the \tmp directory, and other facets of an attack are all garnered by the disparate systems constituting a corporate security defense. Discrete components, for example VSE or NSP, see and log components of the attack. But, currently, the aggregate view is missing. However, the data exists for mining in the collection of logs in EPO or STEM.

DESCRIPTION OF EMBODIMENTS

Figure 1:
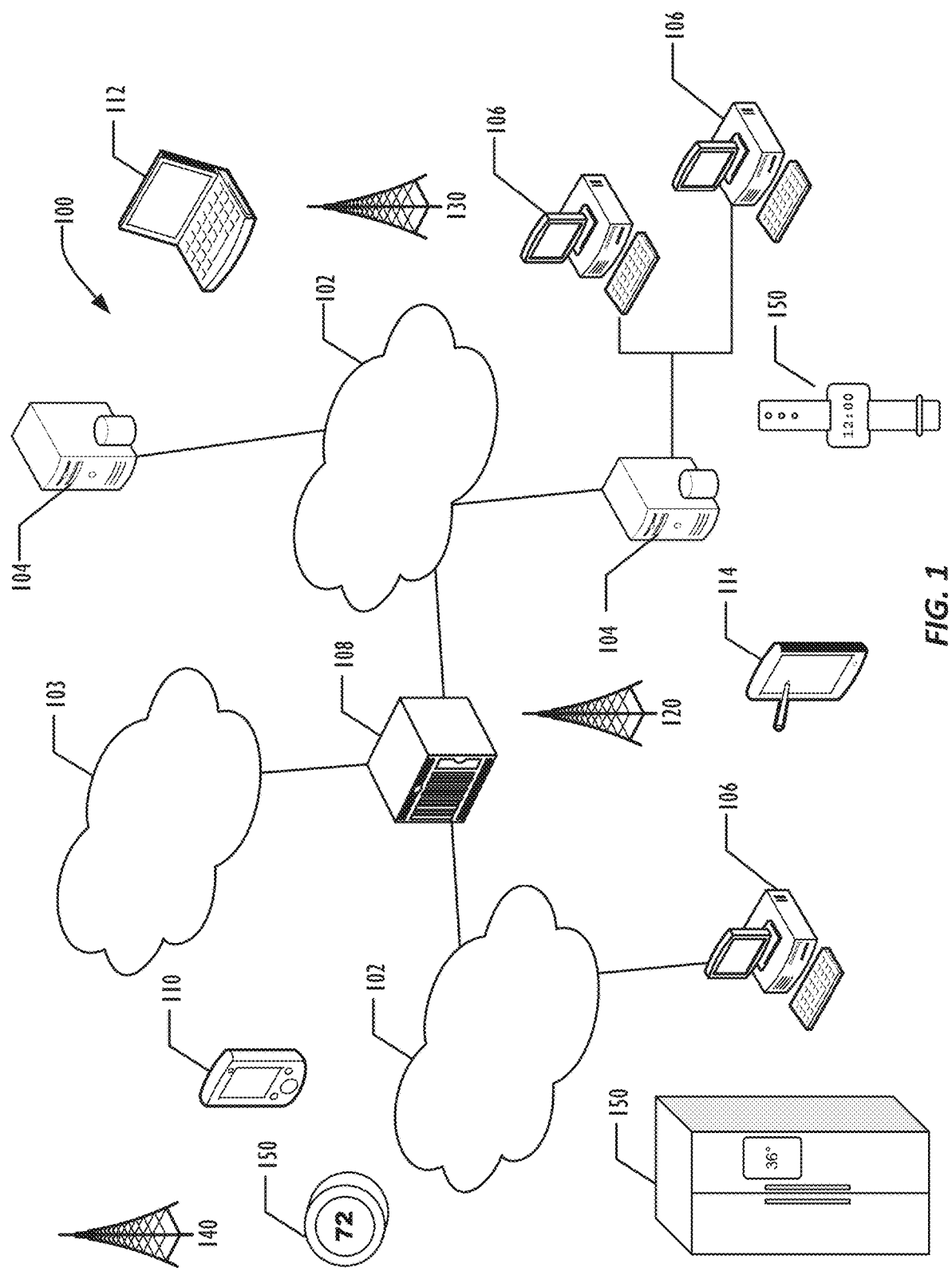
FIG. 1 is a diagram illustrating a network of programmable devices according to one or more embodiments.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "programmable device" can refer to a single programmable device or a plurality of programmable devices working together to perform the function described as being performed on or by the programmable device.

As used herein, the term "medium" refers to a single physical medium or a plurality of media that together store what is described as being stored on the medium.

As used herein, the term "network device" can refer to any programmable device that is capable of communicating with another programmable device across any type of network.

According to one or more embodiments, likely compromised endpoints in a network may be detected based on log entropy. In one or more embodiment, suspect endpoints may be identified based on a dynamic number of logs recorded for the endpoint over a time window and how the frequency and change in frequency of the logging activity relates to other, uninfected peer endpoints. In one or more embodiments, for purposes of this explanation, a log may be any kind of file structure that tracks events generated by a monitoring application. As an attack unfolds on an endpoint, the frequency of the logging activity for that endpoint may change as sensors record more or less activity relative to its peers. Thus, the attack may be detected based on a view of the log itself, without any semantic knowledge of the log. Said another way, by analyzing a rate at which events are logged for an endpoint under attack compared to the logging for other endpoints over the same time period, a compromised endpoint may be detected without reviewing the content of the log entries. In one or more embodiments, the endpoint may be compromised if it is being affected by malware. Further, in one or more embodiments, by monitoring a rate of log events for an endpoint, an endpoint that is in the process of being compromised may be identified even if it is not completely compromised. Thus, for purposes of clarity, a compromised endpoint in the following description may additionally include endpoints in the process of being compromised.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, a Local Area Network (LAN), or a personal network, such as those over a Bluetooth connection. Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things (microcontrollers, embedded systems, industrial control computing modules, etc.) 150. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

Figure 2:
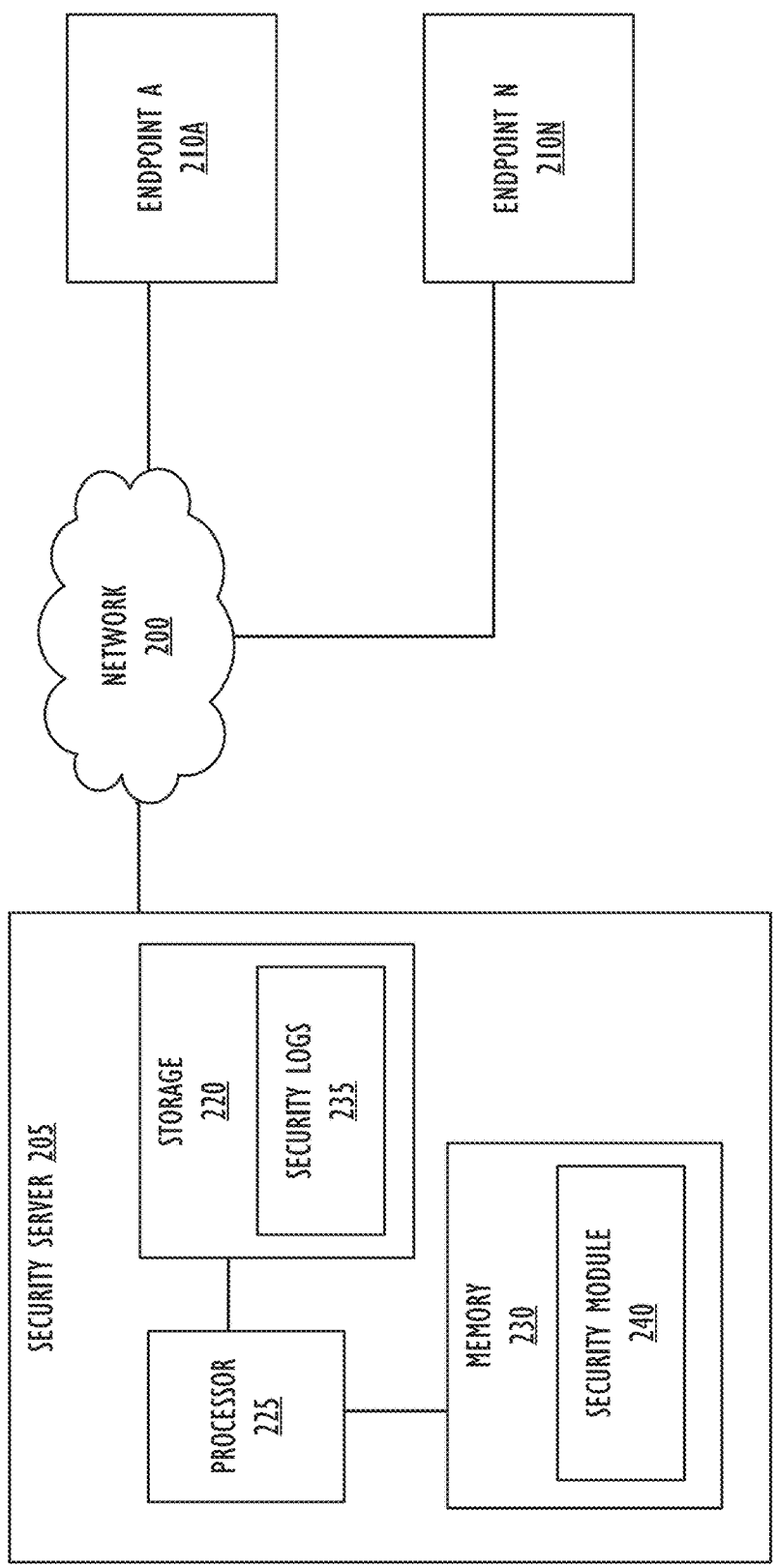
FIG. 2 is a diagram illustrating an example system for detecting compromised endpoints, according to one or more embodiments.

FIG. 2 is a diagram illustrating an example system for detecting likely compromised endpoints, according to one or more embodiments. For purposes of this disclosure, an endpoint may be considered "compromised" if it is likely to be compromised, or suspected to be compromised, according to one or more embodiments. FIG. 2 includes a security server 205 connected to multiple endpoints, such as endpoint A 210A and endpoint B 210B, across a network 200. Security server 205 may include, for example, a storage 220, a memory 230 and processor 225. Memory 230 may include a number of software or firmware modules executable by processor 225. In one or more embodiments, memory 230 may include a security module 240 used to provide security services for endpoints 210A and 210B. For example, security module 240 may provide malware scan functionality. Security module 240 may also include functionality to manage event logs for various endpoints across the network 200. Security module 240 may store the logs as security logs 235 in storage 220. Although the various components and modules are shown and described in a specific configuration, it should be understood that the functionality of the various components and modules may be performed by alternative devices. Further, the various functionality of the modules and components may be differently combined or distributed across the network 200.

In one or more embodiments, the security module 240 may include functionality to prepare the security logs for analysis for determination of a compromised endpoint. According to one or more embodiments, the preparation may be completed by the security module 240, or by another module in security server 205, such as a preprocessor (not shown). In one or more embodiments, the log files may be parsed and anonymized using time windows.

According to one or more embodiments, security module 240 may also calculate internal and external entropy for the event logs of the various endpoints. In one or more embodiments, internal entropy may be a ratio of unique log entries for an endpoint to the total number of log entries for the endpoint within a time window. A time window may be any sample period for metric collection. For example, a time window could be a set of discrete, non-overlapping windows, or a continuous set, where the next window begins somewhere within the preceding window. A discrete time window may include windows of time that are continuous, and non-overlapping. According to one or more embodiments, utilizing discrete time windows may be advantageous because computational complexity is less than with overlapping windows, but the discrete windows mean that suspicious activity may not be detected if it occurs across two consecutive time windows. Continuous time windows can overlap by one or more log entries. Conversely to discrete time windows, the continuous time windows may be more responsive to changes in entropy because changes will not be lost across multiple time windows. However, utilizing continuous time windows may require higher computational complexity. In one or more embodiments, the data may be anonymized to the extent that values which are recorded have no customer- or user-identifiable data. Instead, for example, the anonymized logs may only include numeric values. In one or more embodiments, in order to identify a particular endpoint, each endpoint may be assigned a unique identifier. As an example, identifying information in the log may be replaced with a unique value, such as a numeric value. An example is a value assigned by McAfee Agent ID. In one or more embodiments, a configuration file controls which tags in the data source are to be used, the time the log entry was recorded, and the end point identifier. Other control parameters, including the time window size, minimum data input for a time window, and the like, may be controlled via the configuration file.

According to one or more embodiments, the log entries in security logs 235 may include various types of information. For example, log entries may include and endpoint identification that identifies the endpoint for which the event was detected, such as a MAC address or an agent identifier. The log entries may also include a timestamp indicating a time at which the event was logged. In one or more embodiments, the log entries may also include an event ID. The event ID may indicate a unique event or event type. In addition, according to one or more embodiments, the event ID may indicate a severity of the detected event.

In one or more embodiments, entropy may be determined based on a rate of log entries during a time window, for example either a discrete time window or a continuous time window. The rate of log entries may be determined based on number of unique event IDs in the log. Internal entropy may be determined as a ratio of unique log entries for an endpoint to the total number of log entries for the end point within a time window. One example of an algorithm that may be utilized to determine internal entropy over all endpoints (0-N) is as follows:

$$\forall\, EP(0:N) IE_i = NORMa\left(\frac{HashMap[TagFields[E_i]] \cdot Size}{Array[TagFields[E_i]] \cdot Size}\right)$$

In the above example algorithm, TagFields[$E_i$] are the log tag fields of interest for EndPoint i gathered within the current time window. NORMa is the normalization function. In one or more embodiments, the output of the normalization function may be −1 to 1, or 0-1. An example where the results are converted to a 0-1 value includes:

Normalized_$IE_i$=($IE_i$-$IE_{min}$)/($IE_{max}$-$IE_{min}$)

Further, according to one or more embodiments, external entropy compares the normalized ratio of unique log entries for an endpoint against the unique log entries of all other end point within a current time window, such as a discrete time window or a continuous time window. An example algorithm for determining external entropy is as follows:

∀$EP(0:N)EE_i$=NORM$b$(HashMap[TagFields[$E_i$]]·Size))

NORMb is the normalization function where the results are converted to a 0-1 value, or a −1 to 1 value, depending on the type of normalization. According to one or more embodiments, an example of a normalization may include either linear normalization or z-score normalization. Linear normalization may be given by:

Normalized_$EE_i$=($EE_i$-$EE_{min}$)/($EE_{max}$-$EE_{min}$)

Z-score normalization may be given by:

Normalized_$EE_i$=($EE$ avg-$EE_i$)/($std(EE)$)

According to one or more embodiments, the example linear normalization algorithm leaves all end points with two 0-1 scores. The example z-score normalization algorithm leaves all endpoints with a −1 to 1 score. In one or more embodiments, the scores relate the entropy to all other end points collected in the current time window. As an example, an endpoint where 8 tag fields have been collected within the time window where each tag field is unique, will receive an internal entropy score of 1. An end point which has 244 unique tag fields collected within the time window, will also have an internal entropy score of 1. If the maximum tag fields collected for all end points within the time window is 244, and the minimum number of tag fields collected is 8, the first end point will have an external entropy score of 0 and the second endpoint will have an external entropy score of 1. Example values are provided in the table below.

| # TF Collected in TW | # Unique TF Collected in TW | IE | EE |
|---|---|---|---|
| 16 | 8 | 0.0 | 0.0 |
| 16 | 16 | 1.0 | 0.19 |
| 44 | 30 | 0.36 | 0.52 |
| 100 | 50 | 0.0 | 1.0 |

Additional values may also be determined and utilized to aid in identifying a compromised endpoint. For example, a confidence value may be determined and associated with a determination for a particular endpoint. Said another way, according to one or more embodiments, a confidence value may be calculated to determine how likely a finding of a compromised endpoint is accurate. One method for determining the confidence of a finding a ratio of internal entropy to standard deviation, which may indicate a variance of a number of standard deviations from the mean. An example method for finding the ratio of internal entropy to standard deviation (RIESD) is as follows:

$$RIESD_i = \frac{DIEAVG_i}{IESD}$$

In the above example algorithm, DIEAVG may be a delta internal entropy average, which is a parameter used in classification. DIEAVG may be a proxy of magnitude and direction of entropy from the mean. According to one or more embodiments, DIEAVG may be calculated by subtracting an internal entropy standard deviation (IESD) from the determined internal entropy. IESD may be determined to be the standard deviation of the internal entropy within the time window. According to one or more embodiments, endpoints with lower entropy than the average have negative values. In one or more embodiments, a delta internal entropy may be a first order derivative of internal entropy, or a rate of change. The delta internal entropy may be determined in any number of ways that express a velocity of the rate of change within a log for a particular endpoint. One example algorithm is as follows:

$$DELTAIE_i = \frac{IE_i - \text{Last\_IE}_i}{\text{Time from last window period collected to current window in minutes}}$$

According to one or more embodiments, endpoints which have not appeared in the log in several time-windows may have their Last_IE set to zero, for example, so that an endpoint that has not appeared in a log recently (for example a couple of hours), does not have an artificially low velocity if it suddenly reappears in the logs with many entries. Said another way, according to one or more embodiments, because endpoints will occasionally cause log entries to be generated, activity within the most recent time frames is more relevant to determining a velocity of the rate of log entries than activity that happened less recently. In one or more embodiments, the delta internal entropy, or velocity measure, may take into account less recent log entries is to record an internal entropy of zero when no log records exist for the endpoint in consecutive windows. However, an internal entropy of zero in this context may not indicate that an endpoint did not exist in the logs, but that the normalized value was among the lowest of the data sets collected.

Similarly, a confidence value may also be calculated to determine how likely a finding of a compromised endpoint is accurate based on external entropy. One method for determining the confidence of a finding a ratio of external entropy to standard deviation, which may indicate a variance of a number of standard deviations from the mean. An example method for finding the ratio of external entropy to standard deviation (REESD) is as follows:

$$REESD_i = \frac{DEEAVG_i}{EESD}$$

In the above example algorithm, DEEAVG may be a delta external entropy average. DEEAVG may be a proxy of magnitude and direction of entropy from the mean. According to one or more embodiments, DEEAVG may be calculated by subtracting an external entropy standard deviation (EESD) from the determined external entropy. EESD may be determined to be the standard deviation of the external entropy within the time window. According to one or more embodiments, endpoints with lower entropy than the average have negative values. In one or more embodiments, a delta external entropy may be a first order derivative of external entropy, or a rate of change. The delta external entropy may be determined in any number of ways that express a velocity of the rate of change within a log for a particular endpoint. One example algorithm is as follows:

$$DELTAEE_i = \frac{EE_i - Last\_EE_i}{\text{Time from last window period collected to current window in minutes}}$$

According to one or more embodiments, the security module 240 may utilize the determination of a likely compromised endpoint to take some action on that endpoint. In one or more embodiments, the security module 240 may generate and transmit a message to a user indicating that an endpoint is likely compromised. Further, in one or more embodiments, the security module may quarantine a likely compromised endpoint, perform some corrective action, or otherwise respond to the determination of the likely compromised endpoint.

In one or more embodiments, the security module may utilize the various measurements to train a machine learning algorithm to determine whether an endpoint is likely compromised without reviewing the contents of the log entries associated with the endpoint. The security module may train the machine learning algorithm in order to generate a model utilized to determine a likelihood that an endpoint is compromised. According to one or more embodiments, the model may be, for example, a decision tree, a tree ensemble, a gradient boosted tree, a Bayesian inference model, or any other kind of model. When generating the model, the machine learning algorithm may be trained with historic security logs. In one or more embodiments, the content of the log entries may be utilized when training the model, but not when using the model to determine a likelihood that an endpoint is compromised.

Figure 3:
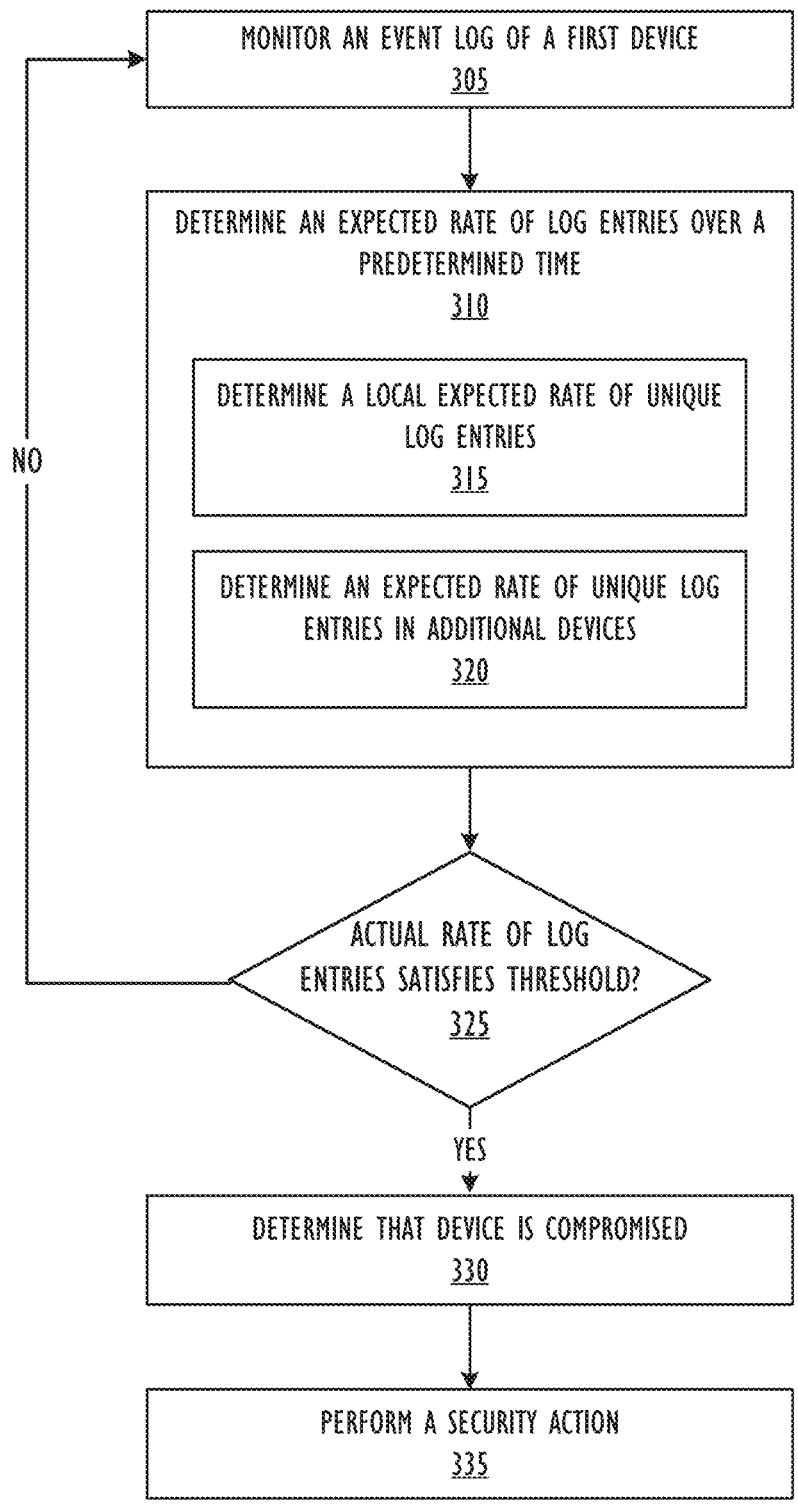
FIG. 3 is a flowchart illustrating a method for detecting compromised endpoints, according to one or more embodiments.

FIG. 3 is a flowchart illustrating a method for detecting compromised endpoints, according to one or more embodiments. According to one or more embodiments, in general, a likely compromised endpoint may be identified based on monitoring a change in the logging of events related to an endpoint rather than the content of the logs of the endpoints. The flowchart begins at 305 and the security module monitors an event log of a first device. In one or more embodiments, the logs may be managed at the endpoint device, or may be managed at a central server, or other network device. As described above, the logs may be generated by any kind of security applications that detect and logs events associated with an endpoint.

At 310, the security module determines an expected rate of log entries over a time window. In order to determine an expected rate of log entries, at 315, the security module may determine a local expected rate of unique log entries. In one or more embodiments, the expected rate of log entries may include an expected rate of change of the number of log entries. Further, at 320, the security module may determine an expected rate of unique log entries in additional devices. The expected rate of log entries may be determine using various methods. For example, as described above, the internal entropy and external entropy for a particular endpoint may be determined. Further, in one or more embodiments, the expected internal and external entropy may be determined based on a machine learning algorithm which may be trained utilizing historic log data for various endpoints. In one or more embodiments, the expected rate of log entries may be a number of log entries logged during a particular dynamic or continuous time window. In one or more embodiments, additional data may be determined regarding an expected rate of log entries. For example, a velocity of the rate of log entries may be determined within a particular time. Moreover, other values may be considered when determining an expected rate of log entries. As an example, the expected rate may include consideration of standard deviations of the expected rate, standard deviations of the expected rate of change, and normalized parameters derived from the rate and the population variance. In one or more embodiments, the actual rate of log entries may be a rate of change of log entries, or a velocity of log entries. That is, the rate of increase or decrease in the number of new log entries may be determined. Thus, the rate of log entries may include a directional rate of change of log entries.

The flowchart continues at 325 and a determination is made regarding whether the actual rate of log entries satisfies a threshold. In one or more embodiments, the threshold may be a predetermined value that may be endpoint-dependent. Further, in one or more embodiments, the threshold may not be a single entry, but multiple values or considerations utilized by a classifier to determine whether an endpoint is likely compromised. According to one or more embodiments, the predetermined value may be indicated in a classifier or model, which may be the result of a training by a machine learning algorithm based on historic log data. Some examples of classifier which may be used include a Naïve Bayes Learner, a Tree Ensemble Learner, and a Gradient Boosted Tree Learner. If at 325 it is determined that the actual rate of log entries does not satisfy a predetermined threshold, then the flowchart returns to 305 and the security module continues to monitor an event log for the first device.

Returning to 325, if a determination is made that the actual rate of log entries satisfies a threshold, then the flow chart continues at 330 and the security module determines that the device is compromised. The actual rate of log entries may satisfy a threshold based on the expected rate of log entries. Further, the actual and expected rate of log entries may be based on external entropy, internal entropy, or both. Said another way, the actual rate of log entries may be compared to an expected rate of log entries for the subject endpoint, or may be based on the actual or expected rate of log entries for the same time window for other endpoints. In one or more embodiments, the device may be considered compromised if the rate of log entries indicates that the endpoint is affected by malware.

The flowchart concludes at 335 and the security module performs a security action. In one or more embodiments, the security module may take action in response to detecting an endpoint that is likely to be compromised or in the process of being compromised. For example, the security module may quarantine the affected endpoint. As another example, the security module may report the affected endpoint to a user or an administrator.

Figure 4:
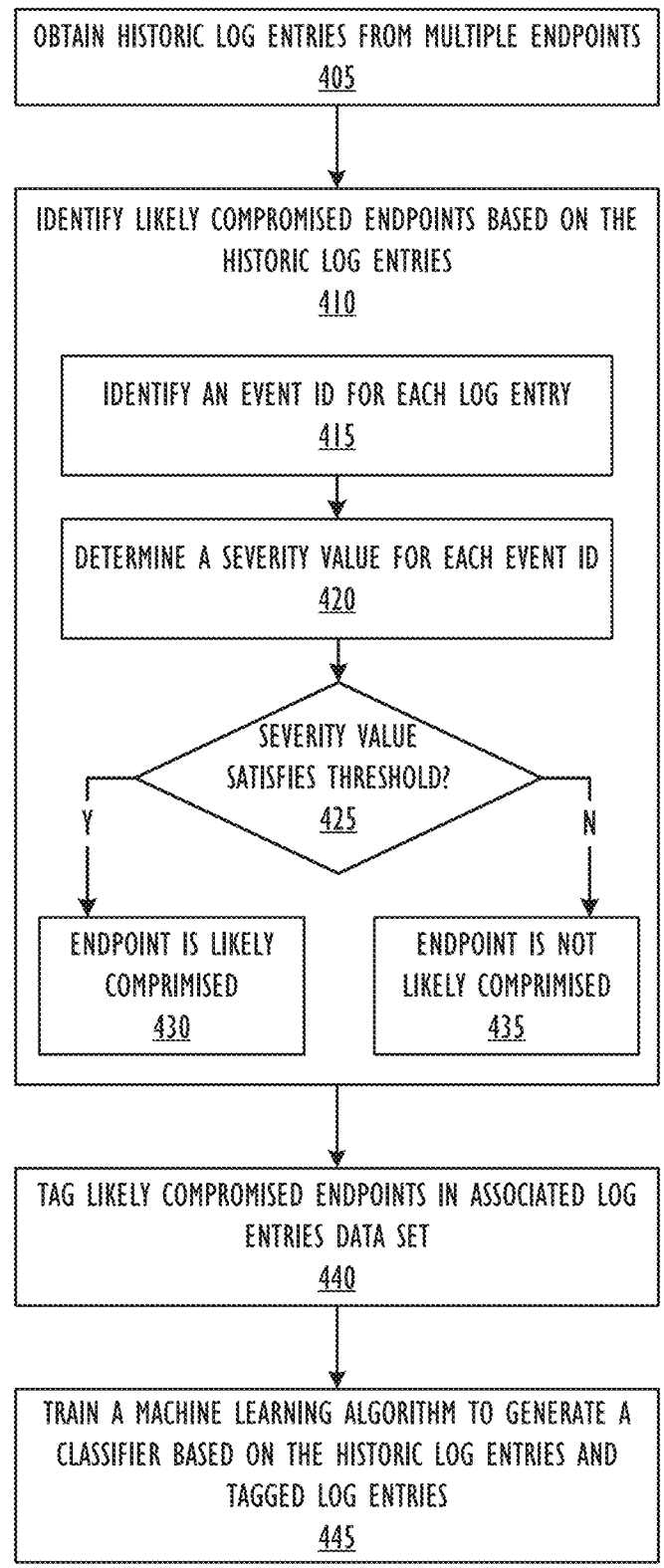
FIG. 4 is a flowchart illustrating a method for training a machine learning algorithm to detect compromised endpoints, according to one or more embodiments.

FIG. 4 is a flowchart illustrating a method for training a machine learning algorithm to detect likely compromised endpoints, according to one or more embodiments. In one or more embodiments, prior to training a model or other classifier, historic data must be anonymized and tagged as either a likely compromised or uncompromised endpoint. The flowchart begins at 405 and the security module obtains historic log entries from multiple endpoints. In one or more embodiments, the endpoints may be any kind of network device.

The flow chart continues at 410 and the security module identifies likely compromised endpoints based on the historic log entries. According to one or more embodiments, unlike the process of detecting a likely compromised endpoint, during the training process, the contents of the logs may be used to determine whether or not the data corresponds to a likely compromised endpoint. In one or more embodiments, identifying a likely compromised endpoint may include various steps. At 415, the security module identifies an event ID for each log entry. In one or more embodiments, the event ID may include a description or a severity of the event depending upon the application submitting the event. An example of event IDs is as follows:

| Event ID | Name | Category | Event Source | ePO 4.x Category | ePO 4.x Action | McLog Event | Description |
|---|---|---|---|---|---|---|---|
| 1000 | NetShield service started successfully | Informational | | | | | |
| 1001 | NetShield service ended successfully | Informational | | | | | |
| 1027 | Infected file deleted | Major | ODS, OAS, Outlook | AV detect, AV PUP | Deleted | 258 | The file %FILENAME% contains %VIRUSNAME% %VIRUSTYPE%. The file was successfully deleted. |
| 1036 | Memory infected | Critical | | | | | |
| 1038 | Scan found infected files | Critical | | | | | |

The flowchart continues at 420 and the security module determines a severity value for each event ID. According to one or more embodiments, the severity value may be a comparative value dictated by the event logs themselves, or may be determined by the security module based on information within the logs. That is, because a reporting application may not utilize a standardized set of event IDs or categories, additional analysis may be required. For example, a semantic analysis may be utilized to identify whether any log entries in an event log indicate a severity level. As an example, a key word scan for terms such as "Trojan" or "av.detect" may identify events that are critical or major.

At 425 a determination is made regarding whether the severity value satisfies a threshold. In one or more embodiments, the threshold may be based on the severity values indicated by the reporting application. Further, in one or more embodiments, a threshold may be determined based on user input. That is, a user may determine what relative severity level may indicate a likely compromised device, according to one or more embodiments. Further, in one or more embodiments, the threshold may also take into consideration time windows. As an example, within a time window for an endpoint, if any event ID is associated with a sufficiently severe entry (such as the "major" or "critical"

identifiers shown above), or if any log entry for the endpoint contains a key word matching the determined severity level, then the endpoint may be classified as "compromised" for purposes of training a classifier. Thus, if at 425, it is determine that the severity value does satisfy the threshold, then the flowchart continues at 430 and the security module determines that the endpoint is likely compromised. Returning to 425, if the security module determines that the severity value does not satisfy the threshold, then the flowchart continues at 435 and the endpoint is determined to not likely be compromised.

The flowchart continues at 440, where the security module tags the likely compromised endpoints in the associated log entries data set. In one or more embodiments, additional analysis may occur for close cases. As an example, a user may parse through close cases to verify that the endpoints should be tagged as likely compromised or not compromised. Further, as another example, a subjective investigation of the false positive compromised end points may undertaken to evaluate their log activity. The categorization of likely compromised endpoints may be ongoing.

The flowchart concludes at 445, where the security module trains a machine learning algorithm to generate a classifier based on the historic log entries and tagged log entries. In one or more embodiments, the classifier may be in the form of a decision tree, a Naïve Bayes Learner, a Tree Ensemble Learner, or a Gradient Boosted Tree Learner.

Figure 5:
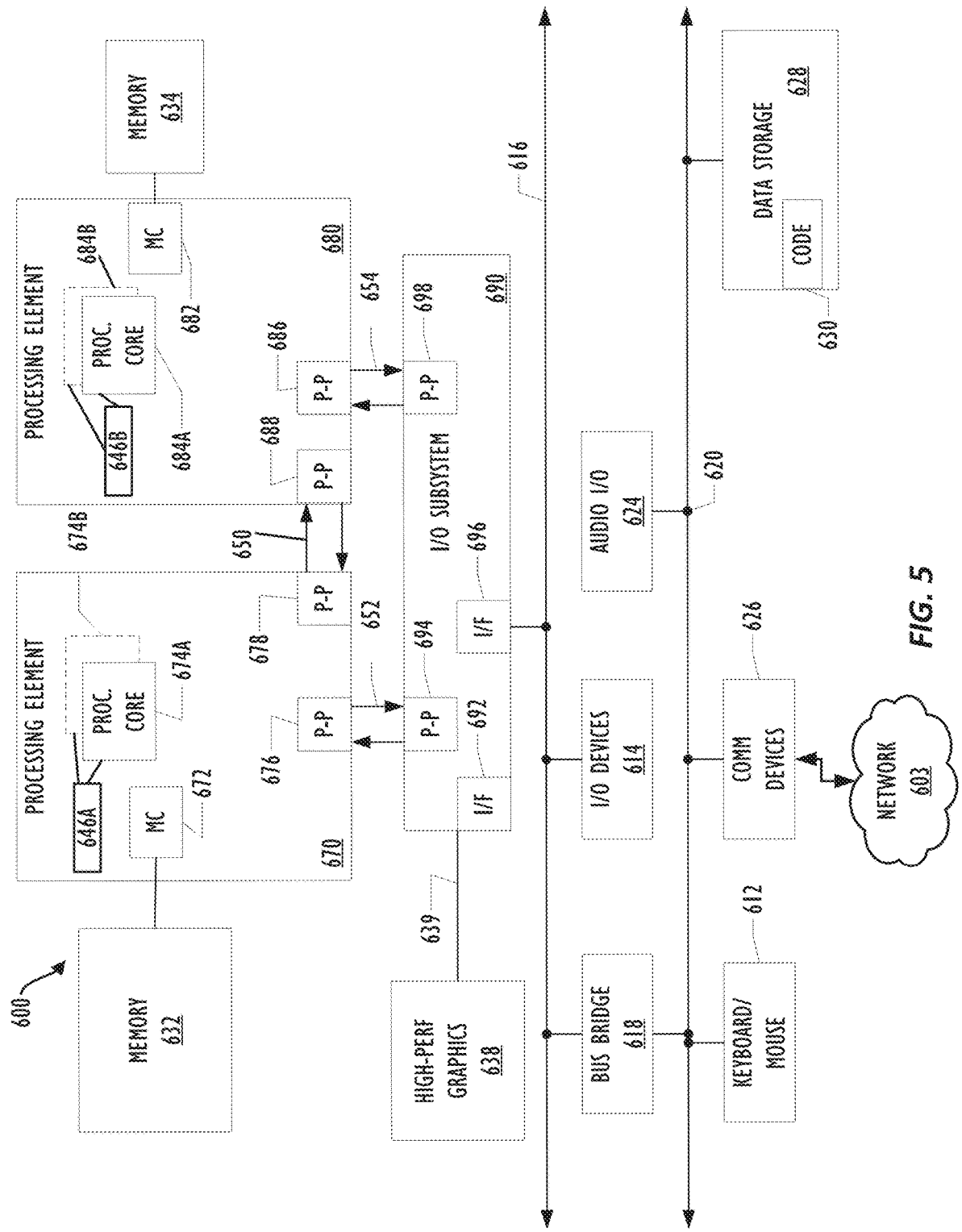
FIG. 5 is a diagram illustrating a computing device for use with techniques described herein according to one embodiment.

Referring now to FIG. 5, a block diagram illustrates a programmable device 600 that may be used within a network device, such as device 205, or device 210, in accordance with one or more embodiments. Devices 205 and 210 may not include all of the elements of FIG. 5. The programmable device 600 illustrated in FIG. 5 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 5 may be implemented as a multi-drop bus rather than point-to-point interconnects.

As illustrated in FIG. 5, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-4. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

Figure 6:
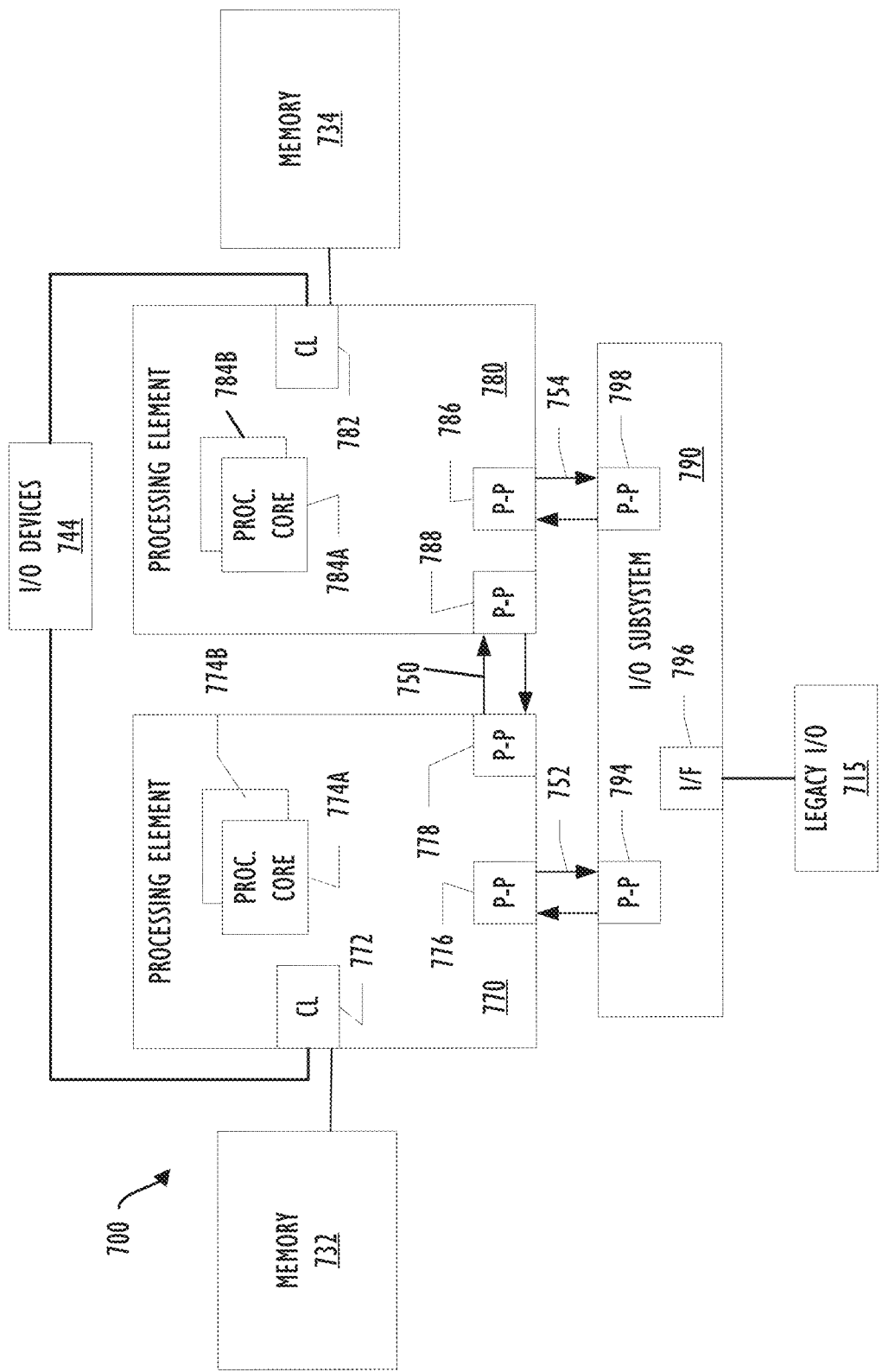
FIG. 6 is a block diagram illustrating a computing device for use with techniques described herein according to another embodiment.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 5, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 5, a system may implement a multi-drop bus or another such communication topology. Although links 616 and 620 are illustrated as busses in FIG. 5, any desired type of link may be used. Also, the elements of FIG. 5 may alternatively be partitioned using more or fewer integrated chips than illustrated in FIG. 5.

Referring now to FIG. 6, a block diagram illustrates a programmable device 700 according to another embodiment. Certain aspects of FIG. 5 have been omitted from FIG. 6 in order to avoid obscuring other aspects of FIG. 6.

FIG. 6 illustrates that processing elements 770, 780 may include integrated memory and I/O control logic ("CL") 772 and 782, respectively. In some embodiments, the 772, 782 may include memory control logic (MC) such as that described above in connection with FIG. 5. In addition, CL 772, 782 may also include I/O control logic. FIG. 6 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 6 as processor cores 774A, 774B, 784A, and 784B. As illustrated in FIG. 6, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 5 and 6 are schematic illustrations of embodiments of programmable devices which may be utilized to implement various embodiments discussed herein. Various components of the programmable devices depicted in FIGS. 6 and 7 may be combined in a system-on-a-chip (SoC) architecture.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Example 1 is a method for detecting a malware attack, comprising: monitoring an event log of a first device, wherein the event log identifies events indicating that the first device is likely compromised; determining an expected rate of log entries during a time window; identifying that an actual rate of log entries during the time window satisfies a threshold; determining, in response to the identifying, that the first device is a compromised device; and performing an action in response to determining that the first device is a compromised device.

In Example 2 the subject matter of Example 1 optionally includes wherein determining the expected rate of log entries during the time window comprises: analyzing the event log to determine a ratio of unique log entries to total log entries in the event log during the time window, wherein the actual rate of log entries comprises a change in the ratio of unique log entries to total log entries during the time window.

In Example 3 the subject matter of Example 2 optionally includes wherein unique log entries are identified as unique based on a tag field in each log entry.

In Example 4 the subject matter of any of Examples 1-3 optionally includes wherein determining the expected rate of log entries over the time window comprises: identifying one or more additional actual rates of log entries for the time window corresponding to one or more additional devices in a network comprising the first device; and wherein determining that the first device is a compromised device comprises comparing the actual rate of log entries for the first device to the one or more additional actual rates of log entries.

In Example 5 the subject matter of Example 4 optionally includes wherein determining the expected rate of log entries comprises: determining a directional rate of change of unique log entries generated by the first device; and comparing the directional rate of change of unique log entries to a directional rate of change of log entries for the one or more additional devices in a same time window.

In Example 6 the subject matter of any of Examples 1-3 optionally includes wherein determining, in response to the identifying, that the first device is a compromised device comprises: calculating a confidence value for the determining based on the expected rate of log entries, the actual rate of log entries, and a standard deviation of the actual rate of log entries.

In Example 7 the subject matter of any of Examples 1-3 optionally includes wherein the event log comprises log entries generated by a security application.

Example 8 is a computer readable medium for detecting a malware attack, comprising computer readable code executable by one or more processors to: monitor an event log of a first device, wherein the event log identifies events indicating that the first device is likely compromised; determine an expected rate of log entries over a predetermined time; identify that an actual rate of log entries over the predetermined time satisfies a threshold; determine, in response to the identifying, that the first device is a compromised device; and perform an action in response to determining that the first device is a compromised device.

In Example 9 the subject matter of Example 8 optionally includes wherein the computer readable code to determine the expected rate of log entries during the time window comprises computer readable code to: analyze the event log to determine a ratio of unique log entries to total log entries in the event log during the time window, wherein the actual rate of log entries comprises a change in the ratio of unique log entries to total log entries during the time window.

In Example 10 the subject matter of Example 9 optionally includes wherein unique log entries are identified as unique based on a tag field in each log entry.

In Example 11 the subject matter of any of Examples 8-10 optionally includes wherein the computer readable code to determine the expected rate of log entries during the time window comprises computer readable code to: identify one or more additional actual rates of log entries for the time window corresponding to one or more additional devices in a network comprising the first device, wherein determining that the first device is a compromised device comprises comparing the actual rate of log entries for the first device to the one or more additional actual rates of log entries.

In Example 12 the subject matter of Example 11 optionally includes wherein the computer readable code to determine the expected rate of log entries comprises computer readable code to: determine a directional rate of change of unique log entries generated by the first device; and compare the directional rate of change of unique log entries to a directional rate of change of log entries for the one or more additional devices in a same time window.

In Example 13 the subject matter of any of Examples 8-10 optionally includes wherein the computer readable code to determine, in response to the identifying, that the first device is a compromised device comprises computer readable code to: calculate a confidence value for the determining based on the expected rate of log entries, the actual rate of log entries, and a standard deviation of the actual rate of log entries.

In Example 14 the subject matter of any of Examples 8-10 optionally includes wherein the event log comprises log entries generated by a security application.

Example 15 is a system for detecting a malware attack, comprising: one or more processors; and one or more memories coupled to the one or more processors and computer readable code stored on the one or more memories and executable by the one or more processors to: monitor an event log of a first device, wherein the event log identifies events indicating that the first device is likely compromised; determine an expected rate of log entries during a time window; identify that an actual rate of log entries during the time window satisfies a threshold; determine, in response to the identifying, that the first device is a compromised device; and perform an action in response to determining that the first device is a compromised device.

In Example 16 the subject matter of Example 15 optionally includes wherein the computer readable code to determine the expected rate of log entries during the time window comprises computer readable code to: analyze the event log to determine a ratio of unique log entries to total log entries in the event log during the time window, wherein the actual rate of log entries comprises a change in the ratio of unique log entries to total log entries during the time window.

In Example 17 the subject matter of Example 16 optionally includes wherein unique log entries are identified as unique based on a tag field in each log entry.

In Example 18 the subject matter of any of Examples 15-17 optionally includes wherein the computer readable code to determine the expected rate of log entries during the time window comprises computer readable code to: identify one or more additional actual rates of log entries during the time window corresponding to one or more additional devices in a network comprising the first device; and wherein determining that the first device is a compromised device comprises comparing the actual rate of log entries for the first device to the one or more additional actual rates of log entries.

In Example 19 the subject matter of Example 18 optionally includes wherein the computer readable code to determine the expected rate of log entries comprises computer readable code to: determine a directional rate of change of unique log entries generated by the first device, compare the directional rate of change of unique log entries to a directional rate of change of log entries for the one or more additional devices in a same time window.

In Example 20 the subject matter of any of Examples 15-17 optionally includes wherein the computer readable code to determine, in response to the identifying, that the first device is a compromised device comprises computer readable code to: calculate a confidence value for the determining based on the expected rate of log entries, the actual rate of log entries, and a standard deviation of the actual rate of log entries.

In Example 21 the subject matter of any of Examples 15-17 optionally includes wherein the event log comprises log entries generated by a security application.

Example 22 is a method for configuring a system for detecting a malware attack, comprising: obtaining a data set comprising a plurality of historic log entries for a plurality of endpoints, wherein the plurality of historic log entries each comprise an event identification and an event time; identifying, for a particular time window, a subset of log entries comprising an event identification associated with a severity value that satisfies a threshold; tagging the subset of log entries as originating from a compromised endpoint; and training a machine learning algorithm to generate a classifier based on the plurality of historic log entries and the tagged subset of log entries.

In Example 23 the subject matter of Example 22 optionally includes wherein the classifier comprises at least one selected from a group consisting of a decision tree, a tree ensemble, a gradient boosted decision tree, and a Bayesian inference model.

In Example 24 the subject matter of any of Examples 22-23 optionally includes wherein the set of log entries can be analyzed using the classifier to identify a potential malware attack.

In Example 25 the subject matter of Example 24 optionally includes wherein the potential malware attack is identified based on identifiers for each log in a set of the future log entries, and not based on content of the set of future log entries.

Example 26 is a system for detecting a malware attack, comprising: means for monitoring an event log of a first device, wherein the event log identifies events indicating that the first device is likely compromised; means for determining an expected rate of log entries during a time window; means for identifying that an actual rate of log entries during the time window satisfies a threshold; means for determining, in response to the identifying, that the first device is a compromised device; and means for performing an action in response to determining that the first device is a compromised device.

In Example 27 the subject matter of Example 26 optionally includes wherein the means for determining the expected rate of log entries during the time window comprises: means for analyzing the event log to determine a ratio of unique log entries to total log entries in the event log during the time window, wherein the actual rate of log entries comprises a change in the ratio of unique log entries to total log entries during the time window.

In Example 28 the subject matter of Example 27 optionally includes wherein unique log entries are identified as unique based on a tag field in each log entry.

In Example 29 the subject matter of any of Examples 26-28 optionally includes wherein the means for determining the expected rate of log entries over the time window comprises: means for identifying one or more additional actual rates of log entries for the time window corresponding to one or more additional devices in a network comprising the first device; and wherein determining that the first device is a compromised device comprises comparing the actual rate of log entries for the first device to the one or more additional actual rates of log entries.

In Example 30 the subject matter of Example 29 optionally includes wherein determining the means for expected rate of log entries comprises: means for determining a directional rate of change of unique log entries generated by the first device; and means for comparing the directional rate of change of unique log entries to a directional rate of change of log entries for the one or more additional devices in a same time window.

In Example 31 the subject matter of any of Examples 26-28 optionally includes wherein the means for determining, in response to the identifying, that the first device is a compromised device comprises: means for calculating a confidence value for the determining based on the expected rate of log entries, the actual rate of log entries, and a standard deviation of the actual rate of log entries.

In Example 32 the subject matter of any of Examples 26-28 optionally includes wherein the event log comprises log entries generated by a security application.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore be determined with reference to the appended claims, along with the full scope of equivalents to which such claims are entitled.

What is claimed is:

1. At least one solid-state device or storage disk comprising computer readable instructions that, when executed, cause at least one processor to at least:
   determine a first entropy value for a first monitored device based on a first number of unique event identifiers included in a first group of log entries obtained for the first monitored device, the first group of log entries associated with a first time window;

determine a second entropy value for the first monitored device based on numbers of unique event identifiers included in corresponding groups of log entries obtained for respective ones of a plurality of monitored devices including the first monitored device, the groups of log entries associated with the first time window, the numbers of unique event identifiers on which the second entropy value is based to include the first number of unique event identifiers included in the first group of log entries obtained for the first monitored device;

determine whether the first monitored device is compromised based on the first entropy value and the second entropy value; and quarantine the first monitored device in response to a determination that the first monitored device is compromised.

2. The at least one solid-state device or storage disk of claim 1, wherein the instructions cause the at least one processor to determine the first entropy value by:

determining a ratio of (i) the first number of unique event identifiers to (ii) a number of log entries obtained for the first monitored device; and normalizing the ratio based on the number of log entries obtained for the first monitored device to determine the first entropy value.

3. The at least one solid-state device or storage disk of claim 2, wherein the log entries are respectively associated with corresponding event identifiers.

4. The at least one solid-state device or storage disk of claim 1, wherein the instructions cause the at least one processor to determine the second entropy value by:

determining the numbers of unique event identifiers included in the corresponding groups of log entries obtained for the respective ones of the monitored devices, the numbers of unique event identifiers including the first number of unique event identifiers associated with the first monitored device; and normalizing the first number of unique event identifiers associated with the first monitored device based on the numbers of unique event identifiers included in the corresponding groups of log entries obtained for the respective ones of the monitored devices.

5. The at least one solid-state device or storage disk of claim 4, wherein the log entries included in the groups of log entries obtained for the respective ones of the monitored devices are respectively associated with corresponding event identifiers.

6. The at least one solid-state device or storage disk of claim 1, wherein the instructions cause the at least one processor to determine whether the first monitored device is compromised by:

determining an actual rate of log entries based on at least one of the first entropy value or the second entropy value;

determining an expected rate of log entries based on at least one of the first entropy value or the second entropy value; and comparing the actual rate of log entries to a threshold, the threshold based on the expected rate of log entries.

7. An apparatus to determine whether a first monitored device is compromised, the apparatus comprising:

memory including computer readable instructions; and at least one processor to execute the computer readable instructions to at least:

determine a first entropy value for the first monitored device based on a ratio of (i) a first number of unique event identifiers included in log entries obtained for the first monitored device to (ii) a number of log entries obtained for the first monitored device, the log entries associated with a first time window;

determine a second entropy value for the first monitored device based on numbers of unique event identifiers included in corresponding groups of log entries obtained for respective ones of a plurality of monitored devices including the first monitored device, the groups of log entries associated with the first time window;

determine whether the first monitored device is compromised based on the first entropy value and the second entropy value; and quarantine the first monitored device in response to a determination that the first monitored device is compromised.

8. The apparatus of claim 7, wherein the at least one processor is to normalize the ratio based on the number of log entries obtained for the first monitored device to determine the first entropy value.

9. The apparatus of claim 8, wherein the log entries are respectively associated with corresponding event identifiers.

10. The apparatus of claim 7, wherein the at least one processor is to determine the second entropy value by:

determining the numbers of unique event identifiers included in the corresponding groups of log entries obtained for the respective ones of the monitored devices entries, the numbers of unique event identifiers including the first number of unique event identifiers associated with the first monitored device; and normalizing the first number of unique event identifiers associated with the first monitored device based on the numbers of unique event identifiers included in the corresponding groups of log entries obtained for the respective ones of the monitored devices entries.

11. The apparatus of claim 10, wherein the log entries included in the groups of log entries obtained for the respective ones of the monitored devices entries are respectively associated with corresponding event identifiers.

12. The apparatus of claim 7, wherein the at least one processor is to determine whether the first monitored device is compromised by:

determining an actual rate of log entries based on at least one of the first entropy value or the second entropy value;

determining an expected rate of log entries based on at least one of the first entropy value or the second entropy value; and comparing the actual rate of log entries to a threshold, the threshold based on the expected rate of log entries.

13. A method to determine whether a first monitored device is compromised, the method comprising:

determining, by executing an instruction with at least one processor, a first entropy value for the first monitored device based on a first number of unique event identifiers included in log entries obtained for the first monitored device, the log entries associated with a first time window;

determining, by executing an instruction with the at least one processor, a second entropy value for the first monitored device based on numbers of unique event identifiers included in corresponding groups of log entries obtained for respective ones of a plurality of monitored devices including the first monitored device, the groups of log entries associated with the first time window, the numbers of unique event identifiers on which the second entropy value is based including the first number of unique event identifiers included in the log entries obtained for the first monitored device;

determining, by executing an instruction with the at least one processor, whether the first monitored device is compromised based on the first entropy value and the second entropy value; and quarantining the first monitored device in response to a determination that the first monitored device is compromised.

14. The method of claim 13, wherein the determining of the first entropy value includes:

determining a ratio of (i) the number of unique event identifiers to (ii) a number of log entries obtained for the first monitored device; and normalizing the ratio based on the number of log entries obtained for the first monitored device to determine the first entropy value.

15. The method of claim 14, wherein the log entries are respectively associated with a corresponding event identifier.

16. The method of claim 13, wherein the determining of the second entropy value includes:

determining the numbers of unique event identifiers included in the corresponding groups of log entries obtained for the respective ones of the monitored devices entries, the numbers of unique event identifiers including the first number of unique event identifiers associated with the first monitored device; and normalizing the first number of unique event identifiers associated with the first monitored device based on the numbers of unique event identifiers included in the corresponding groups of log entries obtained for the respective ones of the monitored devices entries.

17. The method of claim 16, wherein the log entries included in the groups of log entries obtained for the respective ones of the monitored devices entries are respectively associated with corresponding event identifiers.

18. The method of claim 13, wherein the determining of whether the first monitored device is compromised includes:

determining an actual rate of log entries based on at least one of the first entropy value or the second entropy value;

determining an expected rate of log entries based on at least one of the first entropy value or the second entropy value; and comparing the actual rate of log entries to a threshold, the threshold based on the expected rate of log entries.

* * * * *